(12) United States Patent
Weber et al.

(10) Patent No.: US 11,377,191 B2
(45) Date of Patent: Jul. 5, 2022

(54) COMPOSITE PANEL WITH REINFORCING PINS

(71) Applicants: AIRBUS DEFENCE AND SPACE GMBH, Taufkirchen (DE); AIRBUS OPERATIONS GMBH, Hamburg (DE)

(72) Inventors: Markus J. Weber, Hamburg (DE); Ulf Henning Neumann, Buxtehude (DE); Gregor Christian Endres, Pfaffenhofen /Ilm (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 16/217,725

(22) Filed: Dec. 12, 2018

(65) Prior Publication Data

US 2019/0263497 A1 Aug. 29, 2019

(30) Foreign Application Priority Data

Feb. 28, 2018 (EP) .................................... 18159080

(51) Int. Cl.
*B64C 1/12* (2006.01)
*B32B 3/08* (2006.01)
*B32B 5/12* (2006.01)
*B32B 27/08* (2006.01)
*B32B 5/02* (2006.01)
(Continued)

(52) U.S. Cl.
CPC ................ *B64C 1/12* (2013.01); *B29C 70/24* (2013.01); *B32B 3/08* (2013.01); *B32B 3/085* (2013.01); *B32B 5/02* (2013.01); *B32B 5/12* (2013.01); *B32B 27/08* (2013.01); *B64C 1/00* (2013.01);
(Continued)

(58) Field of Classification Search
CPC .. B32B 7/08; B32B 3/08; B32B 3/085; B32B 5/02; B32B 5/12; B32B 27/08; B32B 2307/542; B32B 2605/18; B29C 70/24; B64C 1/12; B64C 2001/0072
See application file for complete search history.

(56) References Cited

U.S. PATENT DOCUMENTS 6,291,049 B1 9/2001 Kunkel et al.
9,289,927 B2 3/2016 Weber et al.
(Continued)

FOREIGN PATENT DOCUMENTS

CN 201371607 Y 12/2009
CN 107107490 A 8/2017
(Continued)

OTHER PUBLICATIONS

Extended European Search Report for Application No. 18159080.3 dated Jul. 24, 2018.
(Continued)

*Primary Examiner* — Maria V Ewald
*Assistant Examiner* — Ethan Weydemeyer
(74) *Attorney, Agent, or Firm* — Jenkins, Wilson, Taylor & Hunt, P.A.

(57) ABSTRACT

A composite panel includes a first skin, a second skin, a core arranged between the first skin and the second skin, reinforcing pins connected by a first end to the first skin and connected by a second end to the second skin, in which inclined reinforcing pins form an angle of from 25 degrees to 40 degrees with the first skin and/or the second skin.

16 Claims, 4 Drawing Sheets

(51) Int. Cl.
*B29C 70/24* (2006.01)
*B64C 1/00* (2006.01)

(52) U.S. Cl.
CPC ..... *B32B 2307/542* (2013.01); *B32B 2605/18* (2013.01); *B64C 2001/0072* (2013.01)

(56) References Cited

U.S. PATENT DOCUMENTS

| | | | |
|---|---|---|---|
| 10,543,664 | B2 | 1/2020 | Ruckdaschel et al. |
| 2009/0035510 | A1* | 2/2009 | Chakrabarti ............ E04C 2/296 428/116 |
| 2013/0230690 | A1 | 9/2013 | Chakrabarti |
| 2013/0266765 | A1* | 10/2013 | Dolzinski ............. B29C 70/086 428/158 |
| 2017/0320290 | A1 | 11/2017 | Endres et al. |

FOREIGN PATENT DOCUMENTS

| | | |
|---|---|---|
| CN | 107257820 A | 10/2017 |
| CN | 107406610 A | 11/2017 |
| CN | 110202856 A | 9/2019 |
| EP | 0653984 B1 | 1/2007 |
| EP | 2 025 504 A1 | 2/2009 |
| EP | 3533599 A1 | 9/2019 |
| WO | WO 95/03170 A1 | 2/1995 |
| WO | WO 97/16303 A1 | 5/1997 |

OTHER PUBLICATIONS

European Office Action for Application No. 18159080.3 dated Feb. 22, 2021.
Chinese Office Action for Application No. 201811610515.8 dated May 10, 2021.
Chinese Office Action for Application No. 201811610515.8 dated Dec. 31, 2021.

* cited by examiner

COMPOSITE PANEL WITH REINFORCING PINS

CROSS-REFERENCE TO RELATED APPLICATION

This application claims priority to European Patent Application No. 18159080.3 filed Feb. 28, 2018, the entire disclosure of which is incorporated by reference herein.

TECHNICAL FIELD

The disclosure herein relates to composite panels such as composite panels for transport application such as aircrafts structures, skins or furniture. It particularly relates to lightweight reinforced composite panels.

BACKGROUND

Composite panels have the main advantage of being lightweight. Composite called sandwich panels having a lightweight core enclosed between two rigid walls or skins are particularly lightweight. They are therefore beneficial in vehicle construction, and particularly in the construction of aircrafts. Indeed weight is a very important factor in reducing the use of fuel in vehicles and particularly of aircrafts.

However, using composites for elements of an aircraft which is submitted to very high loads, in compression or torsion, and to vibrations is challenging. Composite panels with specific properties are required to replace aircraft parts usually made of metal alloys.

U.S. Pat. No. 6,291,049 discloses a sandwich structure including a core having opposing top and bottom surfaces, a plurality of discrete pins disposed through the core and extending beyond the top and bottom surfaces of the core, a face sheet on the top core surface, and a face sheet on the bottom core surface. The pins secure the face sheets to the core, improve the strength of the core, and provide a physical connection between the two face sheets.

US 2013/0230690 discloses a polymer-based composite sandwich including a reinforced core bonded between a pair of composite facesheets. The core includes a truss formed by groups of composite pins held in place by a layer of structural foam. The pins in the groups are radially arranged around nodes. The ends of the pins are splayed and sandwiched between the foam layer and the facesheets. The pins are angled at 30 or 35 degrees from vertical between the two facesheets. The pins are beneficially spaced from each other by a gap.

EP 2 025 504 intends to provide a composite panel with a high shear strength. It discloses a polymer-based composite sandwich including a reinforced core bonded between a pair of composite facesheets. The core includes a truss formed by groups of composite pins held in place by a layer of structural foam. The pins in the groups are radially arranged around nodes. The ends of the pins are bonded to the facesheets. The pins are inclined relative to the facesheets. The pins are angled at an angle Phi of 30 or 35 degrees from vertical represented by a central axis orthogonal to the facesheet. Groups of pins may intersect to form nodes on a facesheet at the central axis.

WO 97/16303 describes a method of forming a pin-reinforced foam core sandwich structure including placing first and second face sheets on opposite sides of a foam core, the foam core having at least one low density sublayer, an optional high density foam sublayer, and a plurality of Z-pins positioned therein.

WO 95/03170 describes a reinforced sandwich structure including opposing face sheets, a foam core therebetween, and tow members encapsulated within the foam core and extending between the opposing face sheets forming a support structure within the foam core between the face sheets. The tow members may reside perpendicularly or at one or more angles between the face sheets or may form a truss structure within the foam core for reinforcing the shear strength of the sandwich structure. The document contains graphs of shear failure mode for different stitch angles between 20-70 degrees, the stich angle being measured between the tow member and a line orthogonal to a face sheet. The optimum specific shear strength occurs at a higher angle of 35 to 40 degrees.

However, such composite panels do not provide an optimal mechanical resistance to shear.

SUMMARY

The disclosure herein aims to provide lightweight composite panels.

The disclosure herein also aims to provide composite panels with a very high resistance to shear loads. Moreover, the disclosure herein aims to provide composite panels with a very high compression resistance.

The disclosure herein also aims to provide a manufacturing method that provides such composites panels.

In the whole text 'projection' on the first skin or the second skin should be understood as an orthogonal projection on any of the two skins and/or on a flat surface.

The subject matter herein discloses a composite panel comprising:
 a first skin,
 a second skin,
 a core arranged between the first skin and the second skin,
 a plurality of reinforcing pins:
  a first end of the reinforcing pin being connected to the first skin at a first connection point, and
  a second end of the reinforcing pin being connected to the second skin at a second connection point,
in which a plurality of inclined reinforcing pins form an angle of from or between 25 degrees and 40 degrees with at least one of the first skin or the second skin.

In particular the inclined reinforcing pins form with the first skin and/or the second skin an angle of from or between 30 degrees and 40 degrees, for example 35 degrees.

A plurality of inclined reinforcing pins may form an angle of about 35 degrees with at least one of the first skin or the second skin.

Such arrangement of the reinforcing pin provides a particularly good resistance to shear stress of the composite panel. In particular it provides an optimal ratio between shear resistance and density of the composite panel. It has been determined in accordance with the disclosure herein that such particular arrangement of the reinforcing pins provides the most efficient use of the reinforcing pins strength against flexion of the composite panel.

Besides, such arrangement provides an optimal ratio of shear resistance and density, for any thickness of the core.

The first skin forms a first face sheet of the composite panel, and the 15 second skin forms a second opposite face sheet of the composite panel. The first skin and the second skin may for example be made of fiber reinforced composite such as carbon fiber layers impregnated with a resin such as a thermoplastic or a thermoset.

The pins may be dry fiber bundles. The fiber materials used may consist of or comprise, for example, aramid fibers, carbon fibers, nylon fibers, polyester fibers, metal fibers or glass fibers, wherein any other fiber materials can also be utilized. The fiber bundles frequently consist of or comprise 12K rovings, i.e., fiber bundles with 12,000 monofilaments. In order to additionally improve the reinforcing effect achieved with the rovings, it would naturally also be possible to utilize rovings with more or less than 12,000 fibers, for example, 24K rovings (24,000 individual fibers) or rovings with even more fibers.

A first distal end of the reinforcing pin is beneficially connected to the first skin. A second distal end of the reinforcing pin is beneficially connected to the second skin. In particular the distal ends of the reinforcing pin may be embedded in a skin. The distal end of a reinforcing pin may be arranged between the core and the skin, or between two layers of the skin. In particular the distal end of a reinforcing pin may be placed in between two layers comprising fibers before the fiber-containing layers are impregnated by a resin material or cured when pre-impregnated fiber-containing layers are used.

The first end of each reinforcing pin may be connected to the first skin at a first connection point, and the second end of each reinforcing pin may be connected to the second skin at a second connection point.

The end of each reinforcing pin may be connected to the first skin or the second skin at a connection point different from the connection point of at least another reinforcing pin. The end of each reinforcing pin may be connected to the first skin or the second skin at a connection point different from the connection point of any another reinforcing pin.

The composite panel may comprise a first group of inclined reinforcing pins having a projection on the first skin and/or on the second skin along a first direction, and a second group of inclined reinforcing pins having a projection on the first skin and/or on the second skin along a second direction, different from the first direction.

The composite panel may comprise a first group of inclined reinforcing pins oriented parallel to a first direction, and a second group of inclined reinforcing pins oriented parallel to a second direction, different from the first direction. The two directions may have parallel projections on the first skin and/or on the second skin. Such configuration may be useful to provide composite panels with a particular shear resistance along a given direction—the directions of the projections of the two groups of inclined reinforcing pins may then be made parallel to the predetermined direction of shear resistance of the composite panel.

The composite panel may comprise a first group of inclined reinforcing pins oriented parallel to a first direction, a second group of inclined reinforcing pins oriented parallel to a second direction, different from the first direction, and a third group of inclined reinforcing pins oriented parallel to a third direction, different from the first direction and from the second direction. The composite panel may comprise more than three groups of inclined reinforcing pins, the groups being determined based on the spatial orientation of the inclined reinforcing pins in the composite panel.

The composite panel may comprise at least three reinforcing pins forming an elementary pattern.

In the whole text the expression 'elementary pattern' may be understood as a motif or exemplar which, when reproduced many times and in a regular fashion may form a pattern—or 'overall pattern'. In an overall pattern, an elementary pattern would be the smallest motif or exemplar that cannot be divided into a plurality of identical motifs.

The elementary pattern comprises three pins arranged so as to have a triangular projection on at least one of the first skin and the second skin.

The composite panel may comprise a plurality of orthogonal reinforcing pins forming an angle of from or between 80 degrees and 100 degrees with at least one of the first skin or the second skin.

Orthogonal pin forming with at least one of the first skin and the second skin an angle of between 80 degrees and 100 degrees, in particular between 85 and 95 degrees, more beneficially of 90 degrees.

The first connection point of a first reinforcing pin with the first skin may be at an orthogonal projection on at least one of the first skin and second skin of a second connection point of a second reinforcing pin with the second skin.

The first connection point of a first reinforcing pin with the first skin may be at an orthogonal projection on the first skin of a second connection point of a second reinforcing pin with the second skin.

The elementary pattern comprises three pins, the connection point of any first pin of the elementary pattern with the first skin being at an orthogonal projection of a connection point of a second pin of elementary pattern with the second skin.

The orthogonal reinforcing pin connecting with the first skin at a connection point of a first inclined reinforcing pin with the first skin and connecting with the second skin at a connection point of a second inclined reinforcing pin with the second skin.

The composite panel may comprise at least six reinforcing pins forming an elementary pattern comprising:
three inclined reinforcing pins forming an angle of from or between 25 degrees and 40 degrees with at least one of the first skin or the second skin,
three orthogonal reinforcing pins forming an angle of from or between 80 degrees and 100 degrees with at least one of the first skin or the second skin, a first end of each orthogonal reinforcing pin being connected with the first skin at a first connection point with a first end of an inclined pin of the elementary pattern, and a second end of each orthogonal reinforcing pin being connected with the second skin at a second connection point with a second end of an inclined pin of the elementary pattern.

An elementary pattern comprises three orthogonal reinforcing pins. Each orthogonal reinforcing pin of an elementary pattern joins a connection point of a first inclined reinforcing pin with the first skin and a connection point of a second inclined reinforcing pin with the second skin. Each orthogonal reinforcing pin of an elementary pattern joins a connection point of a first inclined reinforcing pin of the elementary pattern with the first skin and a connection point of a second inclined reinforcing pin of the elementary pattern with the second skin.

Thereby an elementary pattern comprises six pins, each pin of the elementary pattern being connected to a first other pin of the elementary pattern at a connection point on the first skin and to a second other pin of the elementary pattern at a connection point on the second skin. The six pins of an elementary pattern thereby form a closed loop. The elementary pattern comprises three connection points with the first skin and three connection point with the second skin.

An elementary pattern may comprise exclusively:
at least one orthogonal reinforcing pin forming with at least one of the first skin and the second skin an angle of from or between 80 degrees and 100 degrees, in particular from 85 and 95 degrees, more beneficially of 90 degrees, and at least one inclined reinforcing pin forming angle with at least one of the first skin and the second skin from or between 25 degrees and 40 degrees, in particular between 30 degrees and 40 degrees, more beneficially of 35 degrees.

An elementary pattern may comprise exclusively:

three orthogonal reinforcing pins forming with at least one of the first skin and the second skin an angle of from or between 80 degrees and 100 degrees, in particular from or between 85 and 95 degrees, more beneficially of 90 degrees, and three inclined reinforcing pin forming angle with at least one of the first skin and the second skin from or between 25 degrees and 40 degrees, in particular from or between 30 degrees and 40 degrees, more beneficially of 35 degrees.

An elementary pattern may comprise three inclined reinforcing pins, two consecutive pins forming an angle of from or between 100 degrees and 140 degrees, in particular between 110 degrees and 130 degrees, and more particular of 120 degrees.

At least three reinforcing pins may converge at a connection point.

A plurality of elementary patterns may be arranged so that more than two pins converge at a connection point. At least three reinforcing pins may converge at a connection point. In particular at least three inclined reinforcing pins may converge at a connection point. In beneficial embodiments three inclined reinforcing pins and one orthogonal reinforcing pin may converge at a common connection point with the first skin or with the second skin. That would for example be the case in some embodiments in which six triangular patterns are adjacent to each other each by one of their corner, and whereby one centered orthogonal reinforcing pin is shared by the six triangular elementary patterns. Similarly an orthogonal reinforcing pin may connect at a first connection point with the first skin with a first group of three inclined reinforcing pins, and connect at a second connection point with the second skin with a second group of three others inclined reinforcing pins. In such configurations, the orthogonal reinforcing pin connects a first lattice, to which the first group of inclined reinforcing pins pertain, with a second lattice to which the second group of inclined reinforcing pins pertain.

A plurality of reinforcing pins may be arranged to form a plurality of elementary patterns.

A plurality of elementary patterns are formed in the core. The plurality of elementary pattern may be adjacent to each other, in that they share at least one common side.

In some embodiments a plurality of reinforcing pins are arranged to form a plurality of identical elementary patterns The plurality of elementary pattern may beneficially form an overall pattern. For example if the projection of the elementary pattern on at least one of the first skin and the second skin is a triangle, an overall pattern may be formed with a plurality of elementary pattern such that the elementary pattern may be grouped so as to form, for example, hexagons comprising six triangles.

At least one reinforcing pin may pertain to two adjacent elementary patterns.

The elementary patterns are adjacent in such a way that at least one pin pertains to two different elementary patterns. For example an orthogonal reinforcing pin may be part of two, three, four, five or six adjacent elementary patterns. Similarly an inclined reinforcing pin may be part of two adjacent elementary patterns.

In some embodiments, each inclined reinforcing pin of an elementary pattern forms the same angle with each of the two other pins. The projection of the three pins on at least one of the first skin and the second skin thus forms an equilateral triangle. The overall pattern formed by a plurality of tangent elementary patterns may therefore have a projection on at least one of the first skin and the second skin consisting of or comprising a mosaic of adjacent equilateral triangles.

The composite panel may comprise at least three inclined reinforcing pins forming an elementary pattern, with at least one of the three inclined reinforcing pins forming a first angle with at least one of the first skin or the second skin bigger than a second angle between at least one other of the three inclined reinforcing pins and the first skin or the second skin.

With one of the three inclined reinforcing pins of a triangular elementary pattern being inclined with a bigger angle than at least one other, the projection of the elementary pattern on the first skin or the second skin is not an equilateral triangle but may be in some particular embodiments an isosceles triangle. The projection of the three pins on at least one of the first skin and the second skin may form a triangle with at least two different angles. The overall pattern formed by a plurality of adjacent elementary patterns may therefore have a projection on at least one of the first skin and the second skin consisting of or comprising a mosaic of adjacent triangles having a higher density in a first direction than in a second direction. In such embodiments the mosaic is 'compressed' in the first direction such that the projection of the sides of the triangles along this direction is in average shorter than the projection of the sides of the triangles on a second direction. The second direction may be orthogonal to the first direction. In such configurations, the shear resistance is higher in the second direction than in the first direction.

In particular, two of the three inclined reinforcing pins may have the same inclination, while the third inclined reinforcing pin forms a bigger angle with the skins. For example, two inclined reinforcing pins may form an angle of 35 degrees with the first skin and/or the second skin, while the third forms an angle of 45 degrees. Therefore the pattern is 'compressed' along the direction of the third inclined reinforcing pin, which reduces the shear resistance along this direction, while the shear resistance remains at its optimum along the directions of the other two inclined reinforcing pins.

A plurality of reinforcing pins may be arranged to form a plurality of imbricated elementary patterns.

Plurality of reinforcing pins may form a plurality of elementary patterns imbricated with each other to form an overall pattern. The projections of the elementary patterns on any of the first skin or the second skin may overlap each other. The overall pattern may be regular or irregular.

A plurality or all the reinforcing pins may be connected to each other via one or more other reinforcing pins, so as to form a lattice. The lattice may form an overall pattern obtained by a plurality of elementary pattern. Each lattice may form a regular pattern.

A first group of reinforcing pins may form a first lattice, and a second group of reinforcing pins may form a second lattice different from the first lattice and imbricated with the first lattice.

A composite panel according to the disclosure herein may comprise three imbricated lattices. It may comprise three lattices, each with triangular elementary patterns forming a regular overall pattern. More particularly, the projections on one skin of the connection points of each of the three lattices may fall within the area of the elementary pattern.

Two or more imbricated lattices may be imbricated in that their patterns are imbricated, but the reinforcing pins forming each lattice are not in contact with any reinforcing pin of another lattice.

A plurality of reinforcing pins may be arranged to form a plurality of elementary patterns forming an overall pattern, in which the density of the elementary patterns in the overall pattern is inhomogeneous.

Therefore the local density of the elementary patterns varies in the overall pattern.

Some elementary patterns may be missing in the overall pattern. The local density of elementary patterns, and as a consequence of reinforcing pins, is thus lower than the average density in the volume occupied by the overall pattern. This permits to lighten the composite panel.

More specifically, a plurality of reinforcing pins are arranged to form a plurality of elementary patterns forming a regular overall pattern, in which the density of the regular pattern is inhomogeneous. The overall pattern may remain a regular pattern, by introducing a repetitive miss in the overall pattern. This allows keeping an overall homogeneous shear and compression resistance of the panel.

Additionally or as alternative, one or more reinforcing pin(s) may be introduced to increase the local density of reinforcing pins. More particularly, one or more elementary pattern may be introduced to increase the local density of elementary pattern. For example additional elementary pattern may locally be added, that are imbricated with one or more other elementary pattern.

The density and mechanical resistance of the composite panel may thus be adapted. In fact, a composite panel according to the disclosure herein, with reinforcing pins at about 35 degrees and 90 degrees provides an optimal ratio of shear and compression resistance to density, whether the overall pattern is missing elementary patterns or not.

Moreover, the composite panel may comprise reinforcing pins arranged so as to combine one or more of the above characteristics. For example, one or more of the following features may be combined in a same embodiment:
varying the angles of inclination of one or more reinforcing pins along a determined direction, so as to 'compress' the pattern of a lattice along a direction, and/or
imbricating a plurality of lattices together, and/or
forming a locally inhomogeneous lattice by missing some elementary patterns in the regular overall.

The disclosure herein also extends to an aircraft comprising at least one composite panel according to the disclosure herein. The disclosure herein is particularly beneficial for vehicles and in particular aircrafts as the particular angles and arrangements of the reinforcing pins proposed by the disclosure herein provides a composite panel with an optimized ratio of shear and compression resistance to density. As weight is a crucial factor in making aircraft more fuel efficient, and composite panels are increasingly used in structures or inner layouts of aircrafts, the disclosure herein provides an important benefit to the construction of aircrafts.

The disclosure herein also extends to a method for manufacturing a composite panel comprising:
preparing a first skin,
preparing a second skin,
arranging a core between the first skin and the second skin,
introducing a plurality of reinforcing pins in the core,
connecting a first end of the reinforcing pin at a first connection point to the first skin,
connecting a second end of the reinforcing pin at a second connection point to the second skin,
in which a plurality of inclined reinforcing pins are introduced at an angle of from or between 25 degrees and 40 degrees with at least one of the first skin or the second skin.

In particular the method comprises:
preparing a first layer for forming a first skin,
preparing a second layer for forming a second skin,
preparing a third layer for forming a core, and placing the core in between the first skin and the second skin.

In a manufacturing method, the reinforcing pins are beneficially inserted in the core and then impregnated with a resin material. The reinforcing pins may be placed in corresponding through-holes crossing the core. The through-holes may have been made previously or simultaneously to the introduction of the reinforcing pins in the core. The through-hole containing the at least one fiber bundle can be infiltrated with a resin in an ensuing step. Reinforcing pins and processes for their use in the present disclosure, in particular for their insertion in the core, are described in the document U.S. Pat. No. 9,289,927 of which the content is herein included.

The disclosure herein also extends to other possible combinations of features described in the above description and in the following description relative to the Figures. In particular, the disclosure herein extends to an aircraft comprising features described in relation to the composite panel and/or the method for manufacturing a composite panel; the disclosure herein extends to methods for manufacturing a composite panel comprising features described in relation to the composite panel and/or the aircraft.

BRIEF DESCRIPTION OF THE DRAWINGS

Some specific exemplary embodiments and aspects of the disclosure herein are described in the following description in reference to the accompanying, example figures.

DETAILED DESCRIPTION

Figure 1:
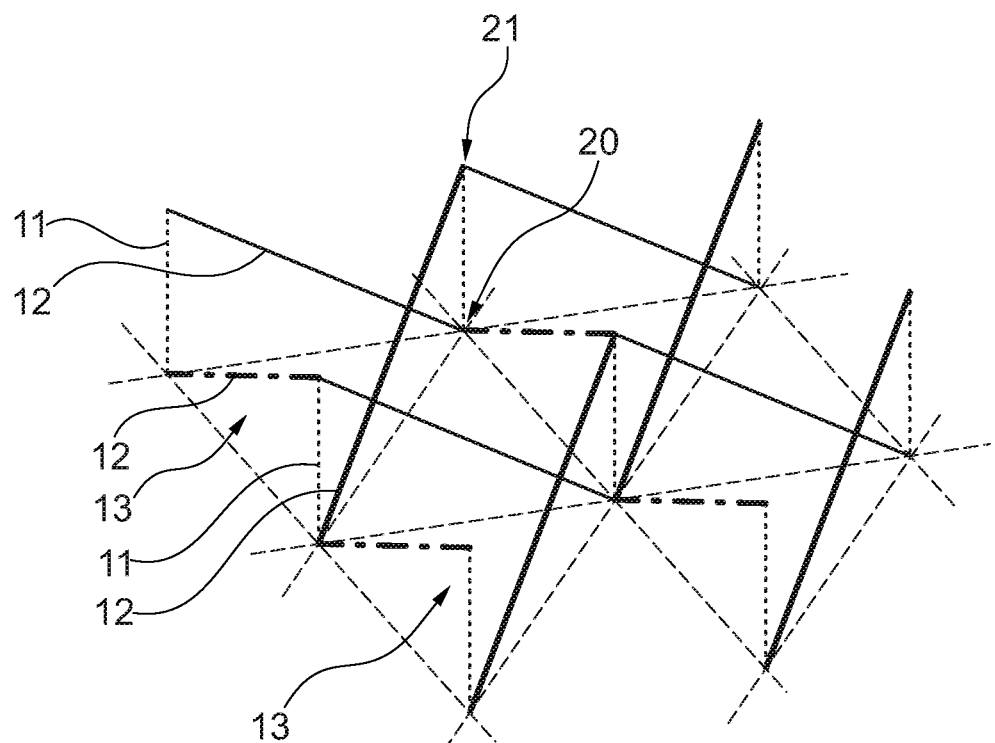
FIG. 1 is a schematic perspective representation of an arrangement of reinforcing pins in a first embodiment of composite panel according to the disclosure herein.

In FIG. 1, a beneficial arrangement of reinforcing pins 11, 12 in a composite panel is represented. The reinforcing pins are placed in a core layer between a first skin and a second skin parallel to the first skin. In this representation the core, the first skin and the second skin are not represented in order to facilitate the understanding of the arrangement of the reinforcing pins 11, 12.

In this specific embodiment orthogonal reinforcing pins 11 cross the core (not represented) from the first skin (not represented) to the second skin (not represented) orthogonally to the first skin and to the second skin. Also, inclined reinforcing pins 12 cross the core from the first skin to the second skin. The inclined reinforcing pins 12 are inclined and form angles of 35 degrees with the first skin and the second skin. The inclined reinforcing pins 12 are oriented along three determined direction, and in FIG. 1 each inclined reinforcing pin 12 is represented by a different type of line according to its orientation. Therefore three groups of inclined reinforcing pins 12 may be distinguished, in which the inclined reinforcing pins 12 of a same group are all parallel to each other. A first group of inclined reinforcing pins 12 is represented with thin solid lines, a second group with thick solid lines, and a third group with dot-dash lines.

In such embodiment, the optimal ratio of shear resistance to density of the composite panel is obtained thanks to the inclined reinforcing pins 12. According to such embodiment, the optimal ratio of compression resistance to density of the composite panel is obtained thanks to the orthogonal reinforcing pins 11.

The first distal ends of each reinforcing pin 11, 12 are connected to the first skin at connection points 21. The second distal ends of each reinforcing pin 11, 12 are connected to the second skin at connection points 20.

The inclined reinforcing pins 12 and the orthogonal reinforcing pins 11 are connected to each other at the connection points 20, 21. In this arrangement, each orthogonal reinforcing pin 11 shares a connection point 21 at the first skin with three inclined reinforcing pins 12 and a connection point 20 with the second skin with three other inclined reinforcing pin 12.

The connection points 20, 21 are the only points at which two or more reinforcing pins 11, 12 contact each other. They are otherwise separate without contact with each other, although oriented in different directions.

Three inclined reinforcing pins 12 and three orthogonal reinforcing pins 11 form an elementary pattern with a triangular orthogonal projection on the second skin. The projection is an equilateral triangle. Each pair of inclined reinforcing pins 12 of an elementary pattern are separate from each other (with not contact point), and form the same angle between them.

The reinforcing pins form multiple elementary patterns 13 adjacent to each other such that each reinforcing pin 11, 22 pertains to at least two elementary patterns 13. The elementary patterns are arranged together so as to form a regular overall pattern. In this embodiment the orthogonal projection on the second skin of the lattice forms an overall pattern represented by short dash-lines on FIG. 1. The overall pattern forms a pavement of the surface with triangles adjacent to each other so as to cover the surface without holes in between them.

Figure 2:
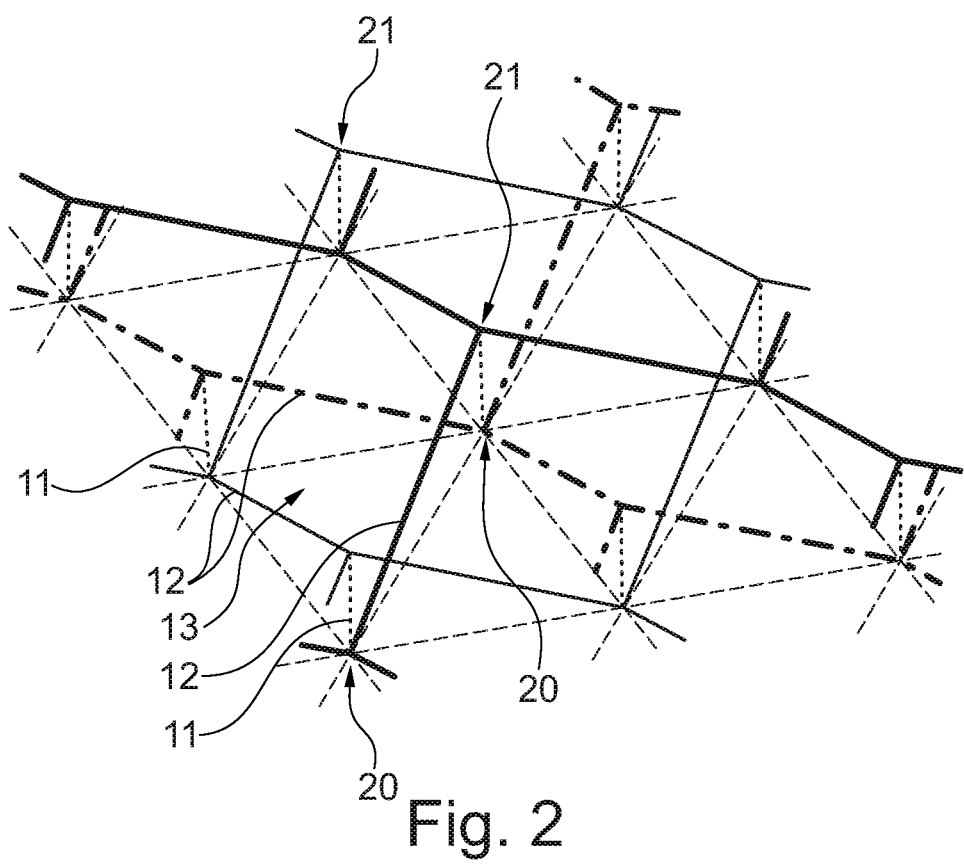
FIG. 2 is a schematic perspective representation of an arrangement of reinforcing pins in a composite panel corresponding to FIG. 1.

In FIG. 2, the same arrangement of reinforcing pins 11, 12 is represented, with a highlight on the lattices formed by three groups of inclined reinforcing pins 12. A first lattice of inclined reinforcing pins 12 is represented by thin solid lines, a second lattice by thick solid lines and a third lattice by dot-dash lines. One may notices on this representation that the three lattices do not contact each other. However, the orthogonal reinforcing pins 11 connect the three lattices together, such that they all form one lattice (or truss). Therefore, in the following embodiments, and in particular in connection to the embodiment of FIG. 6, the combination of the inclined reinforcing pins 12 and orthogonal reinforcing pins 11 that are connected together will be considered as one lattice.

Figure 3:
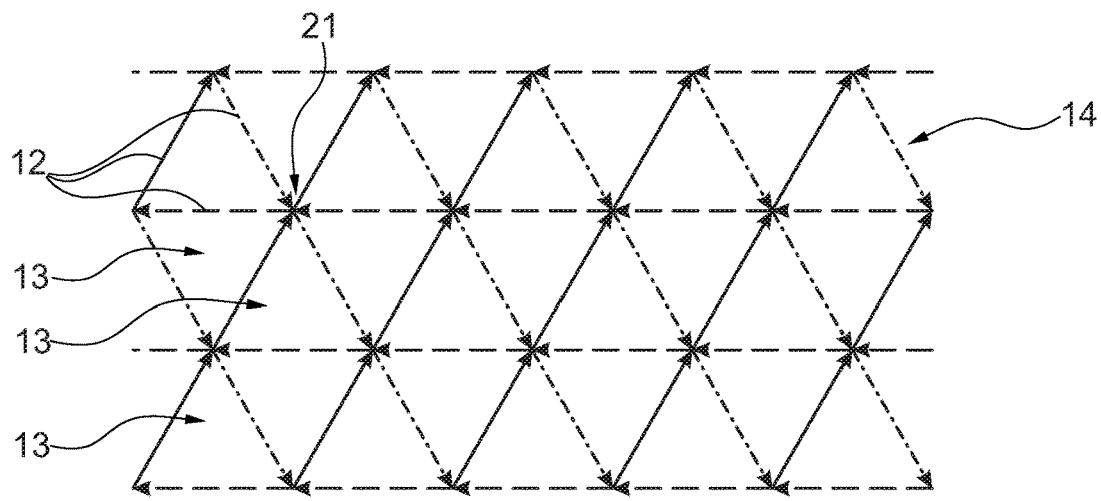
FIG. 3 is a schematic top-view representation of an arrangement of reinforcing pins in a composite panel corresponding to FIGS. 1 and 2.

In FIG. 3 an orthogonal projection of the lattice 14 of FIGS. 1 and 2 is represented. Such projection may be an orthogonal projection on the first skin and/or on the second skin of the composite panel. The projection forms a regular overall pattern comprising a plurality of equilateral triangular elementary patterns 13 adjacent to each other. In such embodiments of FIGS. 1, 2, and 3, two adjacent reinforcing pins 11, 12 always form the same angle between them.

In FIGS. 3, 4, 5 and 6 the arrow heads show the connection point of a first distal end of a reinforcing pin with the first skin. At each connection point 21 with the first skin, three inclined reinforcing pins 12 connect to the first skin. At the orthogonal projection of each connection point, is another connection point with the second skin, at which the second distal end of three other inclined reinforcing pins 12 connect to the second skin.

Figure 4:
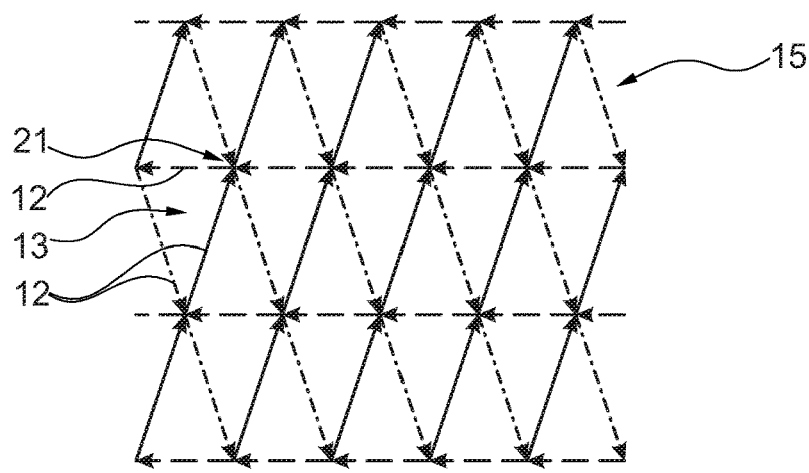
FIG. 4 is a schematic top-view representation of an arrangement of reinforcing pins in a second embodiment of composite panel according to the disclosure herein.

In FIG. 4 an orthogonal projection of a further embodiment is represented. In this embodiment, the lattice 15 comprises two groups of inclined reinforcing pins 12 (here represented respectively with solid lines and dot-dash lines) which form an angle of 35 degrees with the first skin and the second skin, while a third group or inclined reinforcing pins 12 here represented with dash lines, oriented along a determined direction forms angles higher than 35 degrees with the first skin and the second skin.

The lattice 15 may also comprise orthogonal reinforcing pins 11 which connect the connection points 21 of the inclined reinforcing pins 12 with the first skin to connections points 20 of the inclined reinforcing pins 12 with the second skin. In such embodiments, the compression resistance of the composite panel is augmented by having an overall density of reinforcing pins 11, 12 higher, in particular along the direction of the third groups of inclined reinforcing pins 12, and also because the inclined reinforcing pins 12 of the third group have a higher angle of inclination with the first skin and the second skin.

The shear compression resistance along the directions respectively of the first group of inclined reinforcing pins 12 and the second group of inclined reinforcing pins 12 remains at its maximum. Therefore, a composite panel according to the disclosure herein may be adapted to the loads that it will undergo during use. In particular it may be customized to have a different shear resistance in one direction and in another direction.

Figure 5:
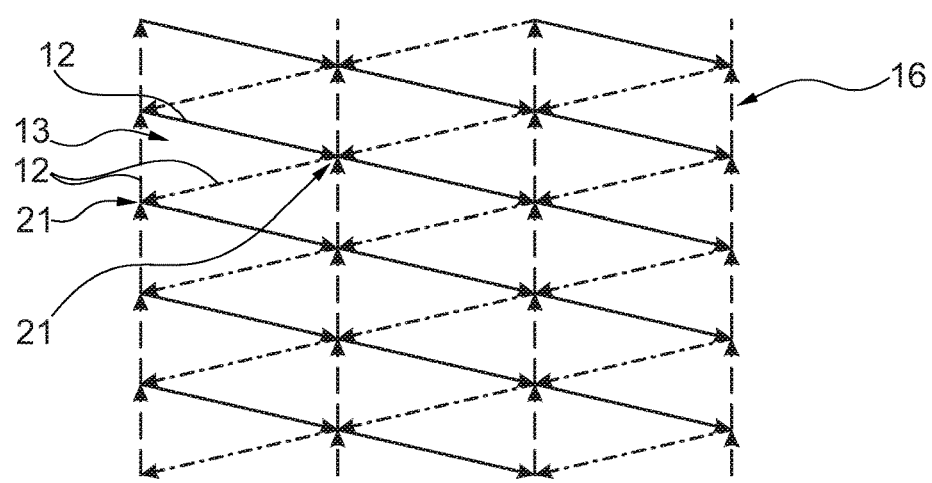
FIG. 5 is a schematic top-view representation of an arrangement of reinforcing pins in a third embodiment of composite panel according to the disclosure herein.

Similarly, in FIG. 5, another embodiment is represented in which the lattice 16 of reinforcing pins form a regular overall pattern comprising a plurality of isosceles triangles. In this embodiment, the angle of a first group of inclined reinforcing pins 12 (in solid lines) and of a second group of inclined reinforcing pins 12 (in dot-dash lines) have form an angle with the first skin and the second skin below 35 degrees, for example of about 30 degrees or 25 degrees. Thereby, a high shear resistance is still maintained in these two directions, although not maximal, but a lower density of reinforcing pins 12 also allows a lower density of the composite panel. A third group of inclined reinforcing pins 12 (in dash lines) may form an angle of 35 degrees with the first skin and/or the second skin, such that the shear resistance along this direction may be optimal.

Figure 6:
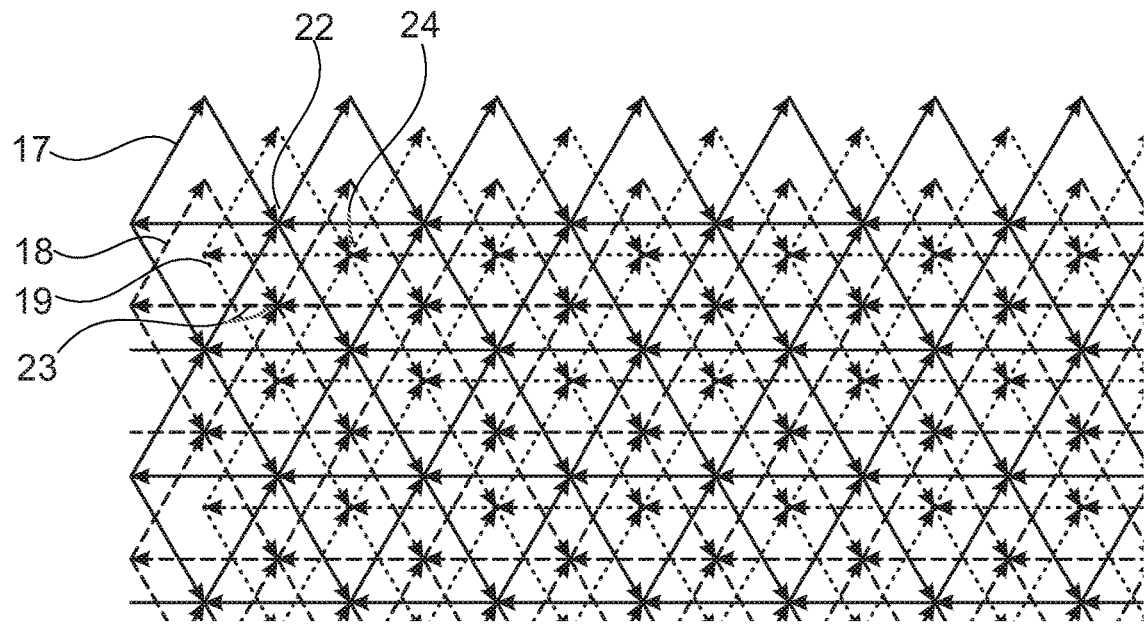
FIG. 6 is a schematic top-view representation of an arrangement of reinforcing pins in a fourth embodiment of composite panel according to the disclosure herein.
Figure 7:
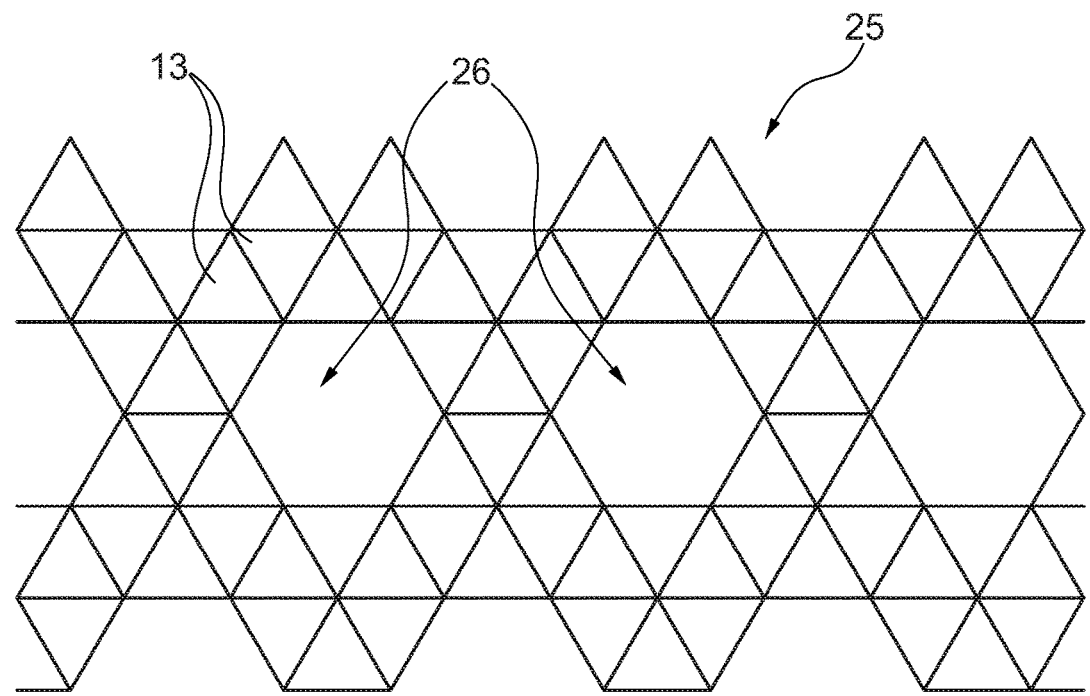
FIG. 7 is a schematic top-view representation of an arrangement of reinforcing pins in a fifth embodiment of composite panel according to the disclosure herein.

In FIG. 6, a further embodiment is represented in which an orthogonal projection (or top-view) of the reinforcing pins on the first skin or the second skin is represented. In FIG. 6, three independent lattices 17, 18, 19 are imbricated. Each lattice may be of the type presented in the FIGS. 1, 2 and 3. However, one or more lattice may be of another type, for example with an elementary pattern having a different shape and/or size and/or with an overall pattern comprising elementary patterns of different shapes and/or with an overall pattern being irregular.

In this embodiment, each lattice 17, 18, 19 is independent from each other such that no reinforcing pin of any lattice contacts any other reinforcing pin of another lattice. In order to obtain a homogeneous composite panel, the orthogonal projections of the connection points 22 of a first lattice 17 each fall respectively within the area (and in some particular embodiments at the center of gravity (barycenter)) of the projection of the elementary pattern of a second lattice 19. In the same way, the orthogonal projections of the connection points 24 of the second lattice 19 each fall respectively within the area (and in some particular embodiments at the center of gravity (barycenter)) of the projection of the elementary pattern of a third lattice 18. The orthogonal projections of the connection points 23 of the third lattice 18 each fall respectively within the area (and in some particular embodiments at the center of gravity (barycenter)) of the projection of the elementary pattern of the first lattice 17.

The density of reinforcing pins is very high in such embodiments, such that the shear resistance and compression resistance of the composite panel may be even higher than in other embodiments such as presented in FIG. 1 for example. Although the density of the composite panel is also higher in such embodiment, the ratio of shear resistance and density is still optimal in such embodiment.

Other embodiments may be considered in which only two lattices are imbricated, or more than 3 lattices are imbricated.

FIG. 6 represents an orthogonal projection (or top-view) of a further embodiment of arrangement of reinforcing pins in a composite panel according to the disclosure herein. In this embodiment, the lattice 25 comprises a plurality of reinforcing pins forming a plurality of elementary patterns adjacent to each other. Each elementary pattern has an orthogonal projection forming an equilateral triangle. Each elementary pattern may be formed of three inclined reinforcing pins and three orthogonal reinforcing pins, as presented in relation to FIGS. 1 and 2.

In this embodiment, some elementary patterns are missing from the overall pattern, such that it appears as holes in the overall pattern. This allows the density of the composite panel to be reduced, while still benefitting from an optimized mechanical resistance, in particular shear resistance and compression resistance, thanks to the remaining elementary patterns.

Nonetheless, the combination of elementary patterns is regular, with regular missing elementary patterns, such that the overall pattern formed is regular. This allows having a generally homogenous mechanical resistance of the composite panel, while benefiting from an overall lower density of the composite panel.

The mechanical properties and density of a composite panel according to the disclosure herein may thus be locally customized to fit the final function and use of the composite panel. Indeed, the disclosure herein also extends to embodiments of composite panels comprising reinforcing pins which may form:
  in a first portion of the composite panel, a single lattice of reinforcing pins,
  in a second portion of the composite panel, multiple lattices of reinforcing pins, with the multiple lattices comprising none or one or more locally or extensively stretched lattices, with the multiple lattices comprising none or one or more locally or extensively missing elementary patterns.

Alternatively or in combination with the above, a composite panel may comprise reinforcing pins forming:
  stretched lattices in a first portion of the composite panel,
  optimized lattices with equilateral triangle orthogonal projection in a second portion of the composite panel.

Alternatively or in combination with the above, a composite panel may comprise reinforcing pins forming:
  an overall pattern with missing elementary patterns,
  an overall pattern with an orthogonal projection covering the complete surface of the surface on which it is projected and where reinforcing pins are present, that is without locally missing elementary patterns.

Alternatively or in combination with the above, a composite panel may comprise reinforcing pins forming:
  one or more lattices forming an overall regular pattern, or
  one or more lattices forming an overall irregular pattern.

Figure 8:
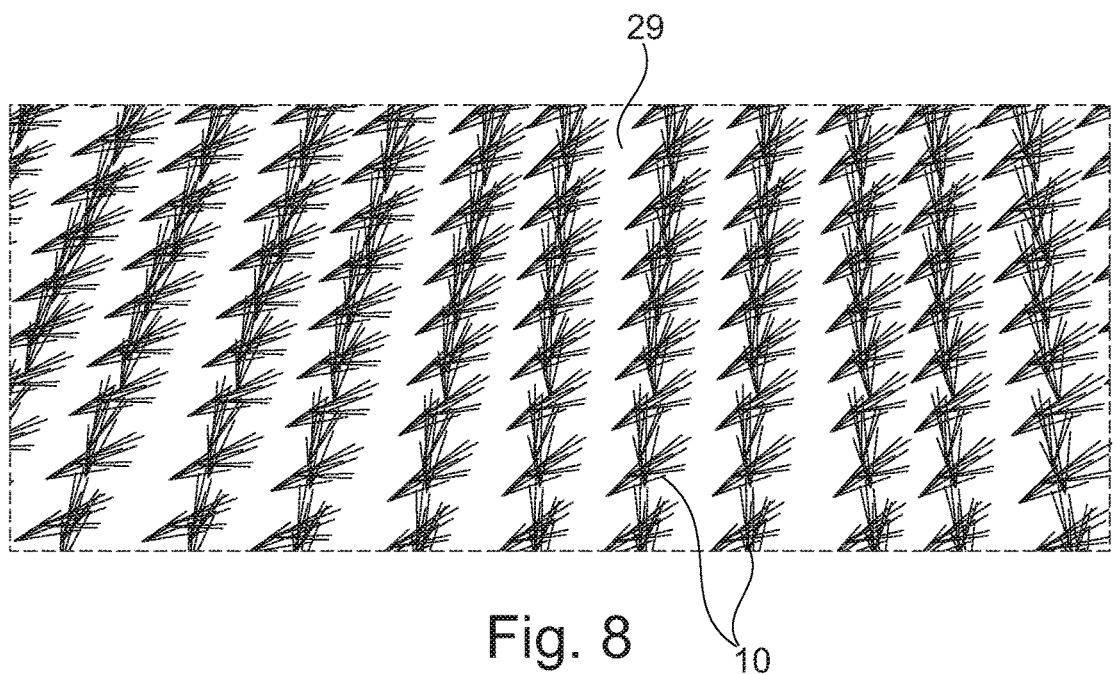
FIG. 8 is a schematic perspective representation of the surface of the core of a composite panel according to the disclosure herein during manufacturing.

FIG. 8 represents a surface of the composite panel during manufacturing. At this stage, a first layer of fiber-reinforced material of the first skin 29 has been laid on the core layer (not represented), and reinforcing pins have been introduced in the core. The distal ends 10 of the reinforcing pins protrude from the surface of this intermediate composite panel. After this stage, one or more layers of fiber-reinforced material will be added on top of the first fiber-reinforced material layer such that the distal ends 10 of the reinforcing pins will be trapped in between these fiber-reinforced layers. The layers and the reinforcing pins may afterwards be impregnated with a resin, and then cured. The distal ends 10 of the reinforcing pins may thus be connected and anchored in the first skin 29.

Figure 9:
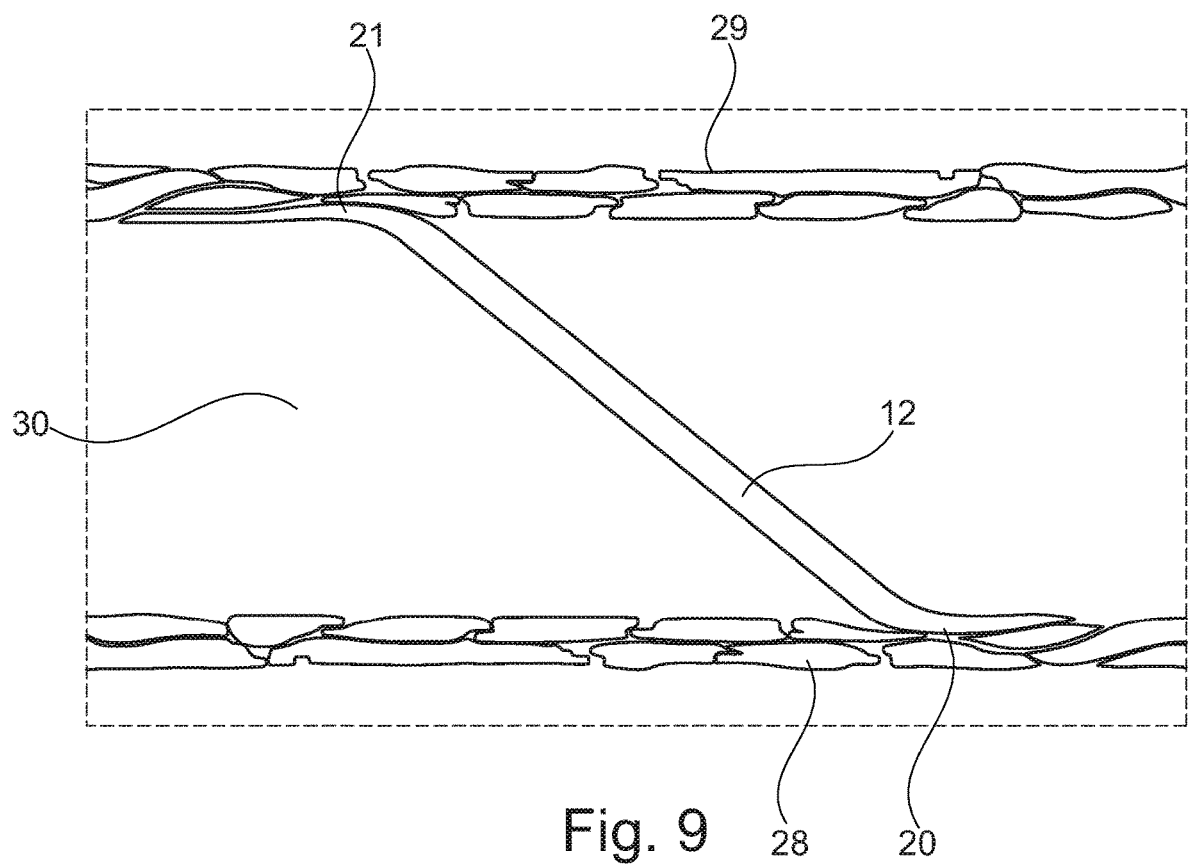
FIG. 9 is a schematic cross-section representation of a composite panel according to an embodiment of the disclosure herein.

FIG. 9 represents a cross-section of a composite panel comprising a first layer forming a first skin 29, a second layer forming a second skin 28, and a third layer forming a core 30 in between the first skin 29 and the second skin 28. An inclined reinforcing pin 12 is represented which forms an angle of approximately 35 degrees with the first skin 29 and the second skin 28.

A first distal end of the inclined reinforcing pin 12 is connected to the first skin 29 at a first connection point 21, while a second distal end of the inclined reinforcing pin 12 is connected to the second skin 28 at a second connection point 20.

The disclosure herein is not limited to the specific embodiments herein disclosed as examples. The disclosure herein also encompasses other embodiments not herein explicitly described, which may comprise various combinations of the features herein described.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A composite panel comprising:
   a first skin;
   a second skin;
   a core between the first skin and the second skin;
   a plurality of reinforcing pins, with a first end of the reinforcing pins being connected to the first skin at a first connection point, and a second end of the reinforcing pins being connected to the second skin at a second connection point;
   wherein the plurality of reinforcing pins comprises:
      a plurality of inclined reinforcing pins that each form a first angle with at least one of the first skin or the second skin of from 25 degrees to 40 degrees; and
      a plurality of orthogonal reinforcing pins that each form a second angle with at least one of the first skin or the second skin of from 80 degrees to 90 degrees.

2. The composite panel according to claim 1, wherein the plurality of inclined reinforcing pins form an angle of about 35 degrees with at least one of the first skin or the second skin.

3. The composite panel according to claim 1, comprising at least three reinforcing pins forming an elementary pattern.

4. The composite panel according to claim 1, wherein the first connection point of a first reinforcing pin with the first skin is at an orthogonal projection on the first skin of a second connection point of a second reinforcing pin with the second skin.

5. The composite panel according to claim 1, comprising at least six reinforcing pins forming an elementary pattern comprising:
   three inclined reinforcing pins forming an angle of from 25 degrees to 45 degrees with at least one of the first skin or the second skin; and
   three orthogonal reinforcing pins forming an angle of from 80 degrees to 100 degrees with at least one of the first skin or the second skin, a first end of each orthogonal reinforcing pin being connected with the first skin at a first connection point with a first end of an inclined pin of the elementary pattern, and a second end of each orthogonal reinforcing pin being connected with the second skin at a second connection point with a second end of an inclined pin of the elementary pattern.

6. The composite panel according to claim 1, wherein at least three reinforcing pins converge at a connection point.

7. The composite panel according to claim 1, wherein a plurality of reinforcing pins form a plurality of elementary patterns.

8. The composite panel according to claim 7, wherein at least one reinforcing pin pertains to two adjacent elementary patterns.

9. The composite panel according to claim 1, comprising at least three inclined reinforcing pins forming an elementary pattern, with at least one of the three inclined reinforcing pins forming a first angle with at least one of the first skin or the second skin bigger than a second angle between at least one other of the three inclined reinforcing pins and the first skin or the second skin.

10. The composite panel according to claim 9, wherein a plurality of reinforcing pins form a plurality of imbricated elementary patterns.

11. The composite panel according to claim 10, wherein a first group of reinforcing pins forms a first lattice, and a second group of reinforcing pins forms a second lattice different from the first lattice and imbricated with the first lattice.

12. The composite panel according to claim 11, wherein a plurality of reinforcing pins form a plurality of elementary patterns forming an overall pattern, in which a density of the elementary patterns in the overall pattern is inhomogeneous.

13. The composite panel according to claim 1, wherein a first group of reinforcing pins forms a first lattice, and a second group of reinforcing pins forms a second lattice different from the first lattice and imbricated with the first lattice.

14. The composite panel according to claim 1, wherein a plurality of reinforcing pins form a plurality of elementary patterns forming an overall pattern, in which a density of the elementary patterns in the overall pattern is inhomogeneous.

15. An aircraft comprising a composite panel according to claim 1.

16. A method for manufacturing a composite panel comprising:
   preparing a first skin;
   preparing a second skin;
   arranging a core between the first skin and the second skin;
   introducing a plurality of reinforcing pins in the core;
   connecting a first end of the reinforcing pin at a first connection point to the first skin; and
   connecting a second end of the reinforcing pin at a second connection point to the second skin;
   wherein the plurality of reinforcing pins comprises:
      a plurality of inclined reinforcing pins that each form a first angle with at least one of the first skin or the second skin of from 25 degrees to 40 degrees; and
      a plurality of orthogonal reinforcing pins that each form a second angle with at least one of the first skin or the second skin of from 80 degrees to 90 degrees.

* * * * *